United States Patent [19]
Nye et al.

[11] Patent Number: 5,084,953
[45] Date of Patent: Feb. 4, 1992

[54] CONTAINER ASSEMBLY MACHINE

[76] Inventors: Norman H. Nye, 1348 Highbridge Rd., Cuyahoga Falls, Ohio 44223; Arthur T. Medkeff, 260 Fawnwood Dr., Tallmadge, Ohio 44278

[21] Appl. No.: 622,427

[22] Filed: Dec. 5, 1990

Related U.S. Application Data

[63] Continuation-in-part of Ser. No. 390,094, Aug. 7, 1989, abandoned.

[51] Int. Cl.⁵ .............................................. B23P 19/02
[52] U.S. Cl. ...................................................... 29/235
[58] Field of Search ................ 29/235, 237, 450, 451, 29/252, 282, 283; 254/29 R; 269/43

[56] References Cited

U.S. PATENT DOCUMENTS

| 2,986,192 | 5/1961 | Macleod | 29/237 |
| 3,083,750 | 4/1963 | Macleod et al. | 29/237 |
| 4,423,829 | 1/1984 | Katz . | |
| 4,731,976 | 3/1988 | Nye . | |

Primary Examiner—Robert C. Watson
Attorney, Agent, or Firm—Oldham & Oldham Co.

[57] ABSTRACT

A machine for installing an elastic sleeve onto the expandable part of a pleated inner liner of a pressure dispensing container.

The container herein referred to is of a non-aerosol type, and uses the contracting force of a tubular rubber sleeve rather than a gas for the dispensing power.

7 Claims, 12 Drawing Sheets

CONTAINER ASSEMBLY MACHINE

This application is a continuation-in-part of my copending application Ser. No. 07/390,094, filed Aug. 7, 1989, now abandoned.

BACKGROUND AND SUMMARY OF THE INVENTION

This invention relates to a machine that is used in the manufacture of pressure dispensing containers such as the type shown and described in U.S. Pat. No. 4,423,829 to Katz. The container referred to therein has a radially expandable pleated inner liner made of plastic, and a heavy walled cylindrical rubber sleeve which surrounds the expandable pleated part of the inner liner. The rubber sleeve is strong and therefore difficult to place onto the pleated inner liner. The machines heretofore designed for this purpose have been complicated and expensive to construct and have not been entirely satisfactory in operation. This invention describes a machine that is simple and has been found to be effective and inexpensive to construct.

BRIEF DESCRIPTION OF THE DRAWINGS

Referring now to the drawings.

DETAILED DESCRIPTION

This invention will now be described in detail with reference to specific embodiments thereof.

Figure 1:
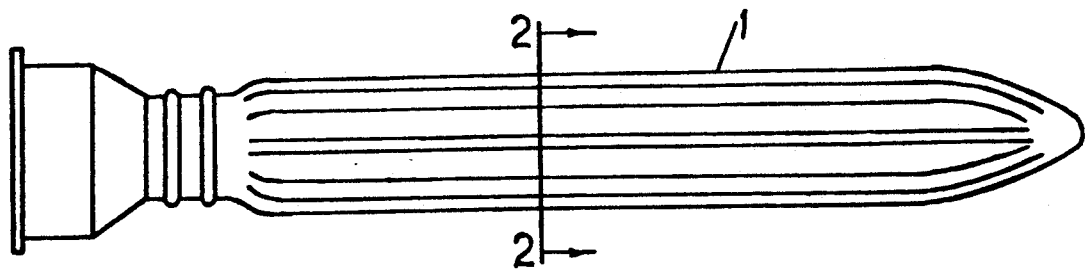
FIG. 1 is a front elevational view of a pleated liner for a pressure dispensing container.
Figure 2:
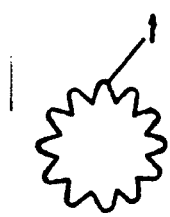
FIG. 2 is a section taken on line A—A of FIG. 1.
Figure 3:
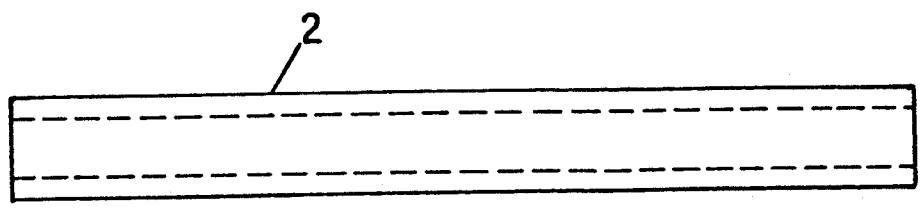
FIG. 3 is a front elevational view of an elastic sleeve.
Figure 4:
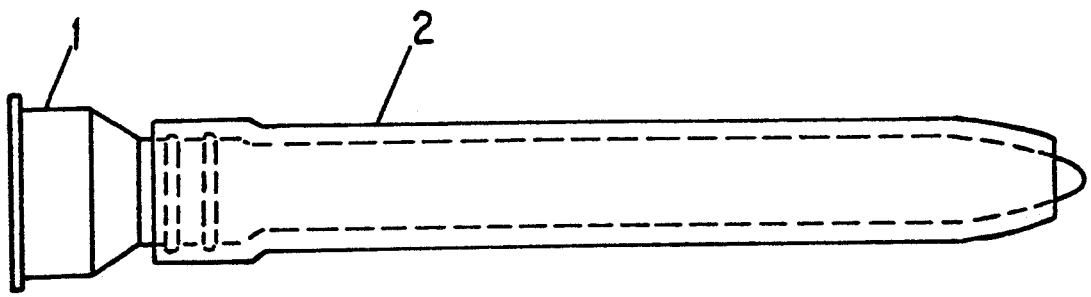
FIG. 4 is a front elevational view of a pressure dispensing container comprising a pleated liner onto which has been assembled an elastic sleeve.

Referring to FIGS. 1, 2, 3 and 4, 1 is a pleated plastic liner (shown in FIGS. 1 and 2) for a container and 2 is a rubber sleeve (shown in FIG. 3) that is to be assembled onto the liner 1 as shown in FIG. 4. In the preferred embodiments, the container is a pressure dispensing container, 1 is a comparatively thin (typically about 0.01–0.02 inch or 10–20 mils thick) longitudinally extending plastic liner, e.g., of polyethylene, open at one end and closed at the other end, and having a pleated essentially cylindrical main body portion. This pleated portion of the liner is radially expandable. The sleeve 2 is a heavy walled cylindrical rubber component, and its inside diameter is less than the outside of the pleated portion of the liner. A pressure dispensing container employing this kind of liner and sleeve is a non-aerosol container in which material is dispensed from the liner by means of the contracting force of the sleeve due to energy stored therein.

Figure 5:
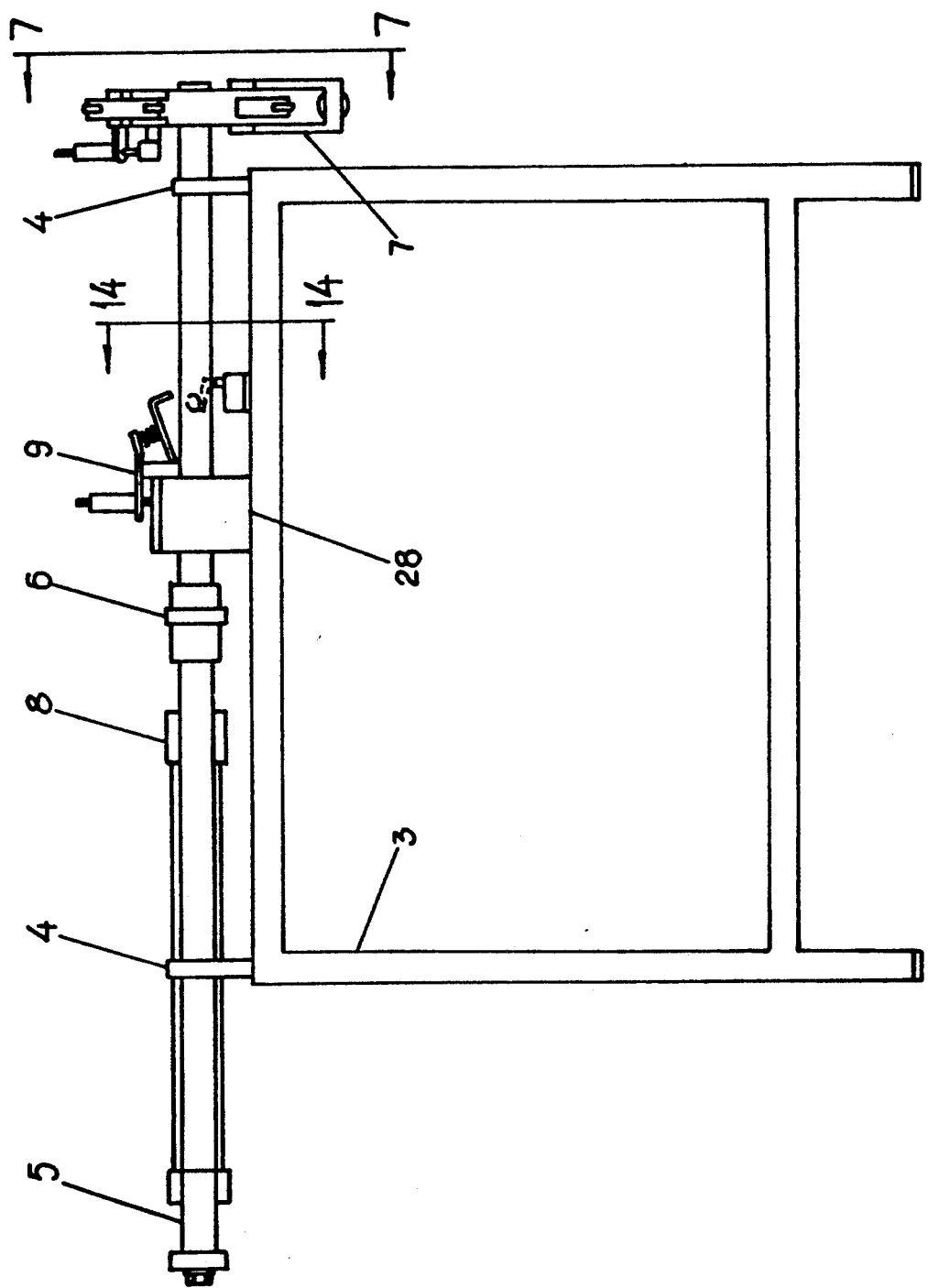
FIG. 5 is a side view of the machine according to one embodiment of this invention.
Figure 6:
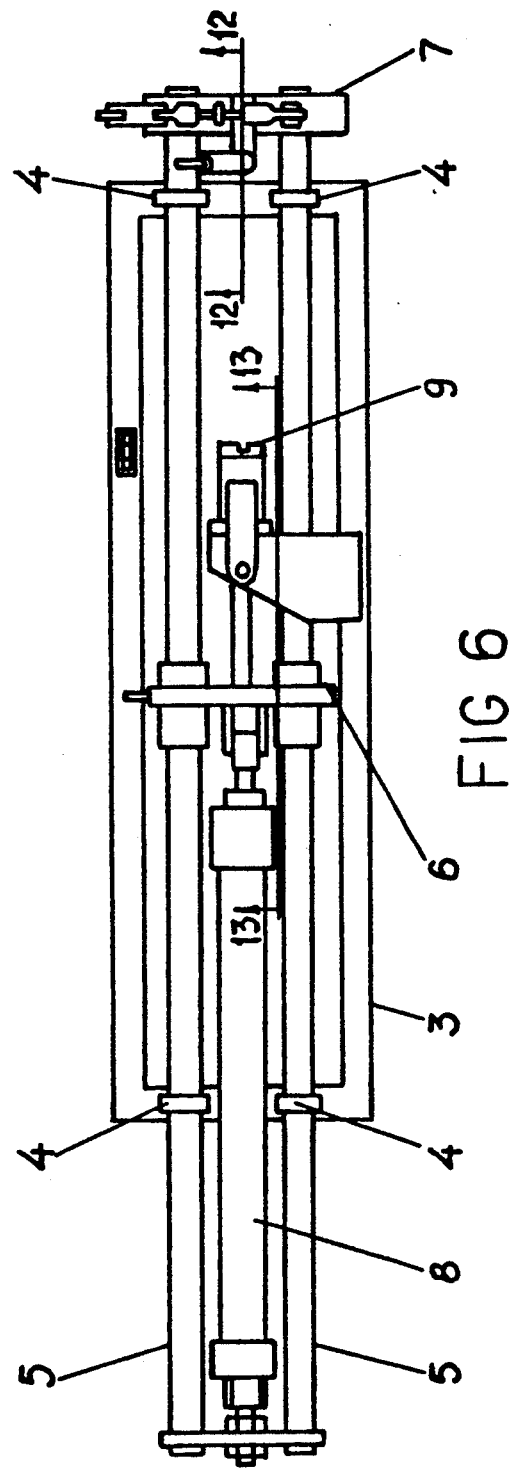
FIG. 6 is a plan view of the machine of FIG. 5.

Referring now to FIG. 5, a frame 3 is provided having upright projections 4 that support stationary slide rods 5 on which is slidably mounted a carriage 6. A squeeze head generally designated as 7 is attached to and supported on one end of slide rods 5. A stripping mechanism 9 is attached to a supported on frame 3.

Figure 7:
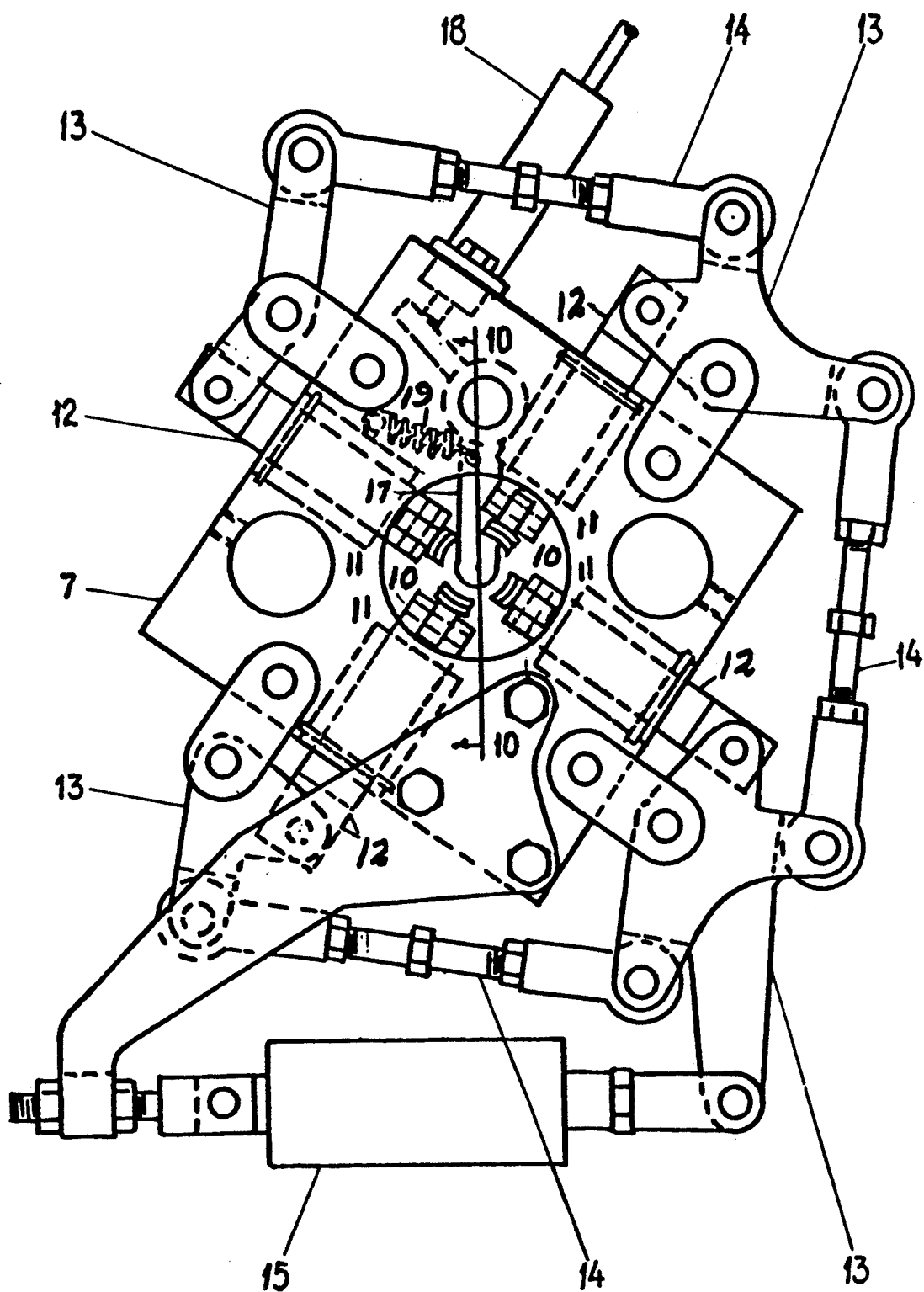
FIG. 7 is a view in the direction B—B of FIG. 5 that illustrates a part of the machine that may be called the squeeze head.
Figure 8:
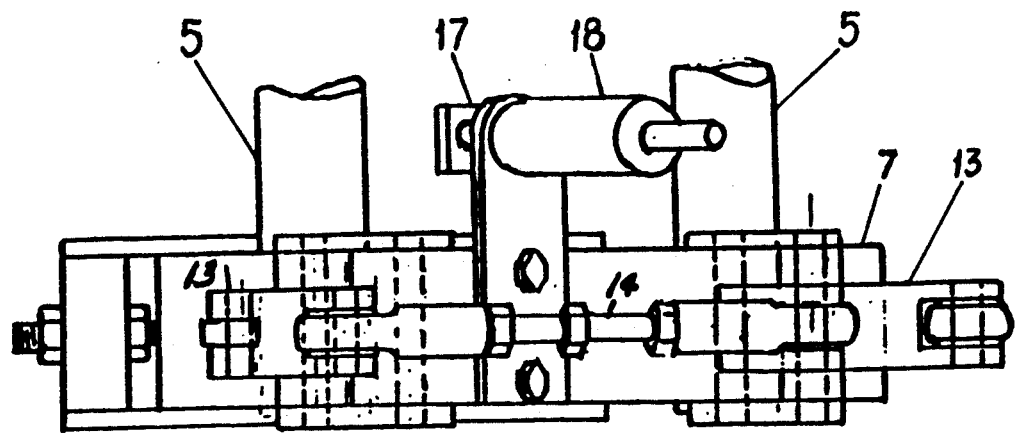
FIG. 8 is a plan view of the squeeze head according to the first embodiment of this invention.
Figure 9:
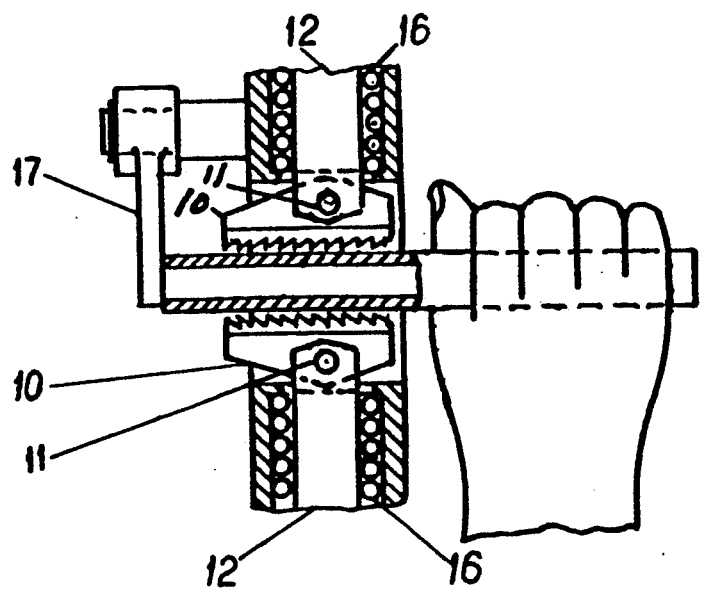
FIG. 9 is a partial section of the squeeze head taken on line C—C of FIG. 7 showing means for gripping or squeezing a rubber sleeve and showing a rubber sleeve being placed in the squeeze head by the hand of an operator.
Figure 10:
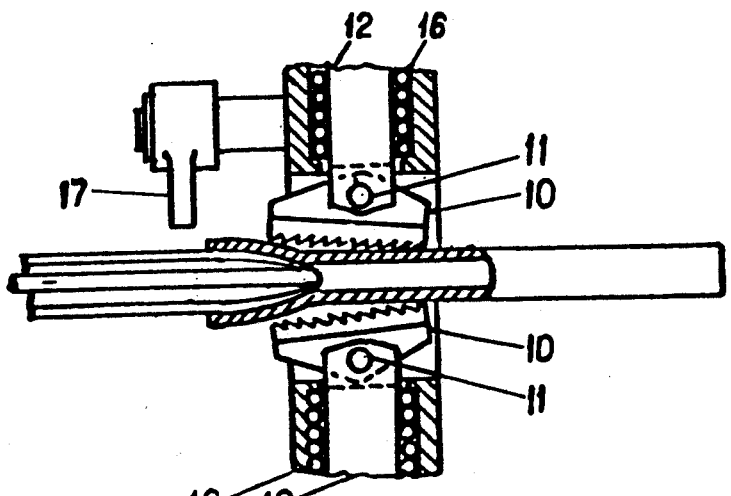
FIG. 10 is a partial section of the squeeze head taken also on line C—C of FIG. 7 that shows a rubber sleeve as it would be at the start of the assembly operation.

Referring now to FIGS. 7, 8, 9 and 10, squeeze head 7 according to the first embodiment of this invention comprises a plurality of gripping members 10, best seen in FIGS. 9 and 10, each having a toothed or otherwise high friction surface, which is provided to grip or squeeze the outer surface of the elastic rubber sleeve 2. Gripping members 10 have pivots 11 and are carried by slotted rods 12. As shown in FIG. 7, gripping members 10 and slotted rods 12 are equiangularly arranged and extend radially from a common axis, which is the longitudinal axis of the squeeze head 7, as best seen in FIG. 7. There are four such gripping members and slotted rods in the illustrated embodiment.

The toothed friction surfaces of the gripping members 10 extend generally parallel to the longitudinal axis of the squeeze head 7. The pivotal mounting of gripping members 10 on rods 12 makes it possible for these gripping members to substantially surround an elastic sleeve 2 and to simultaneously contact different portions of said sleeve which have different diameters, as shown in FIG. 10.

The slotted rods 12 are movable laterally in a direction radial to the axis of the squeeze head 7. The radial movement of the slotted rods 12 is by equal increments that are controlled by means of bell cranks 13 and links 14 and the force of which is provided by an air cylinder 15. The slotted rods 12 are mounted in low friction linear ball bearing 16.

A movable stop lever 17 is provided for locating laterally the rubber sleeve 2 before it is gripped or squeezed by members 10. The movement of stop lever 17 is controlled by a miniature air cylinder 18 and spring 19.

The apparatus of this invention further comprises longitudinal guidance means for bringing the radially expandable liner 1 and the elastic sleeve 2 together by moving one or both members along a longitudinal path towards the other and for placing the elastic sleeve 2 on the outside of the expandable liner 1, either by inserting the expandable liner 1 into the elastic sleeve 2 while the sleeve is held in place or by forcing the sleeve 2 over the liner 1 while the liner is held in place (the two are equivalent operations). The apparatus specifically illustrated herein causes the liner 1 to be moved longitudinally along the axis of the squeeze head 7 while the sleeve 2 is held in place by the gripping means 10 of squeeze head 7. As previously noted, one may hold the liner 1 in place while moving the sleeve 2 toward the liner is one prefers.

Figure 11:
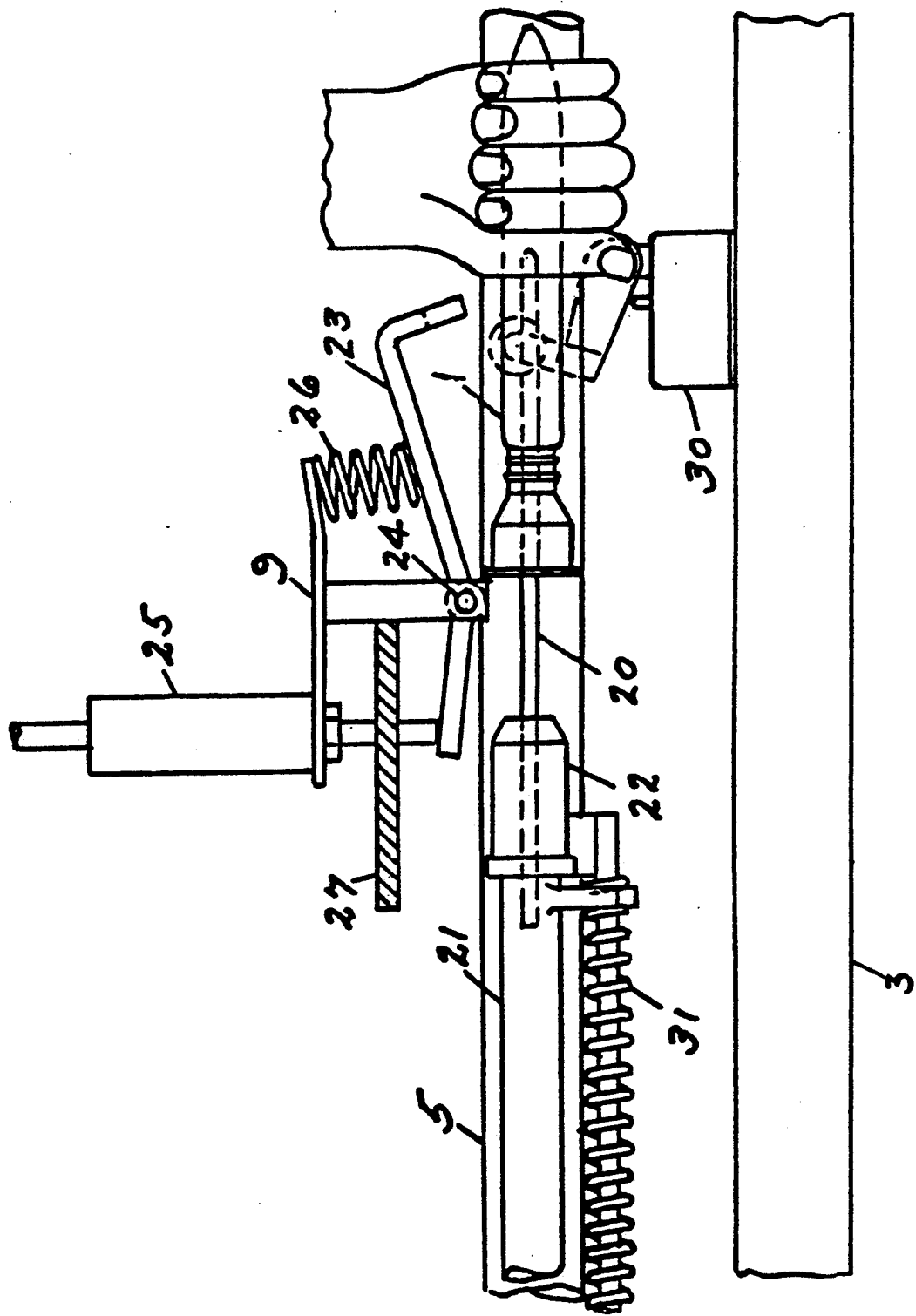
FIG. 11 is a partial section taken on line E—E of FIG. 6 showing a pleated liner being placed into the machine by the hand of an operator.

Referring now to FIG. 11, a loading arbor is attached to a supporting rod 21 that is also attached to and is part of carriage 6. The arbor 20 is cylindrical and its longitudinal axis coincides with that of the squeeze head 7. To form a container, one places a liner 1 on the arbor 20 and moves the arbor and liner thereon toward a sleeve 2, as will be described subsequently in further detail.

Figure 12:
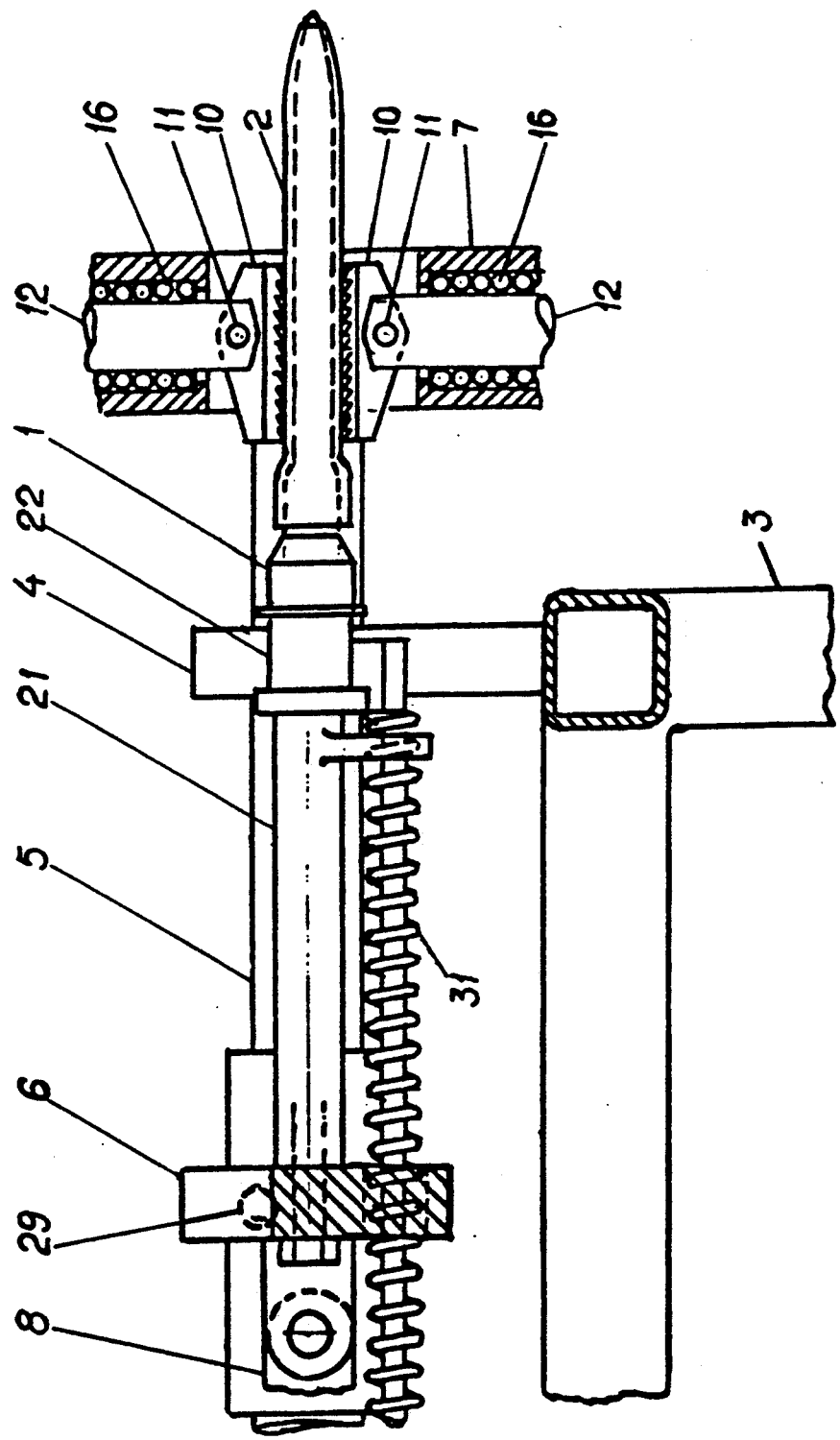
FIG. 12 is a partial section taken on line D—D of FIG. 6 illustrating that part of the cycle in which the pleated liner has been pushed into the rubber sleeve.

FIG. 12 shows the position of carriage 6 at the extreme end of the reciprocation at which time the rubber sleeve 2 has been installed on the pleated liner 1 and is ready to be retracted by means of the main air cylinder 8 to pass through the stripping operation as shown in FIG. 12.

Figure 13:
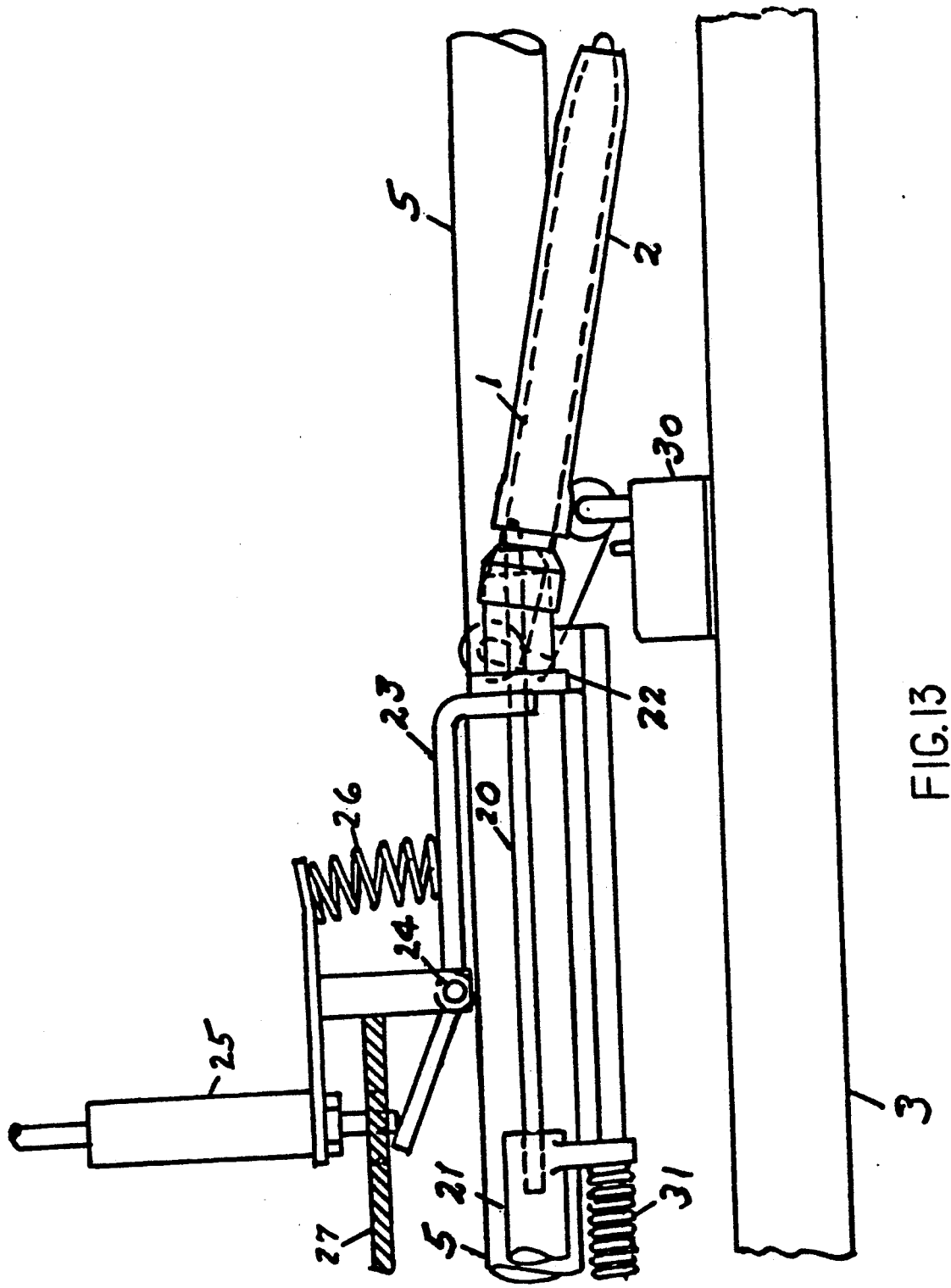
FIG. 13 is a partial section taken on line E—E of FIG. 6 illustrating an assembled pleated liner and rubber sleeve being stripped from the machine after the assembly operation has been completed.
Figure 14:
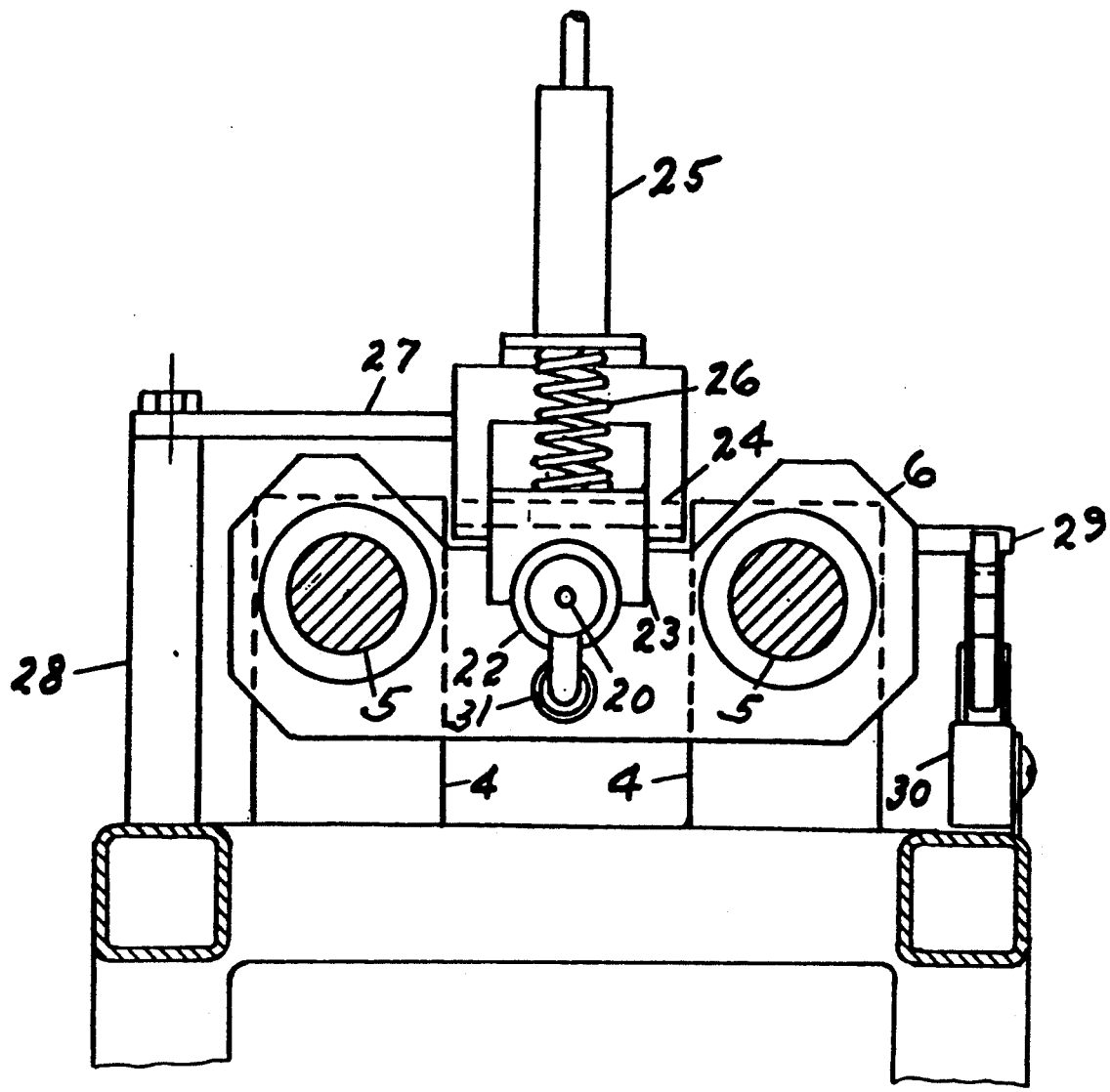
FIG. 14 is a section taken on line F—F of FIG. 5 showing part of the stripping mechanism.
Figure 15:
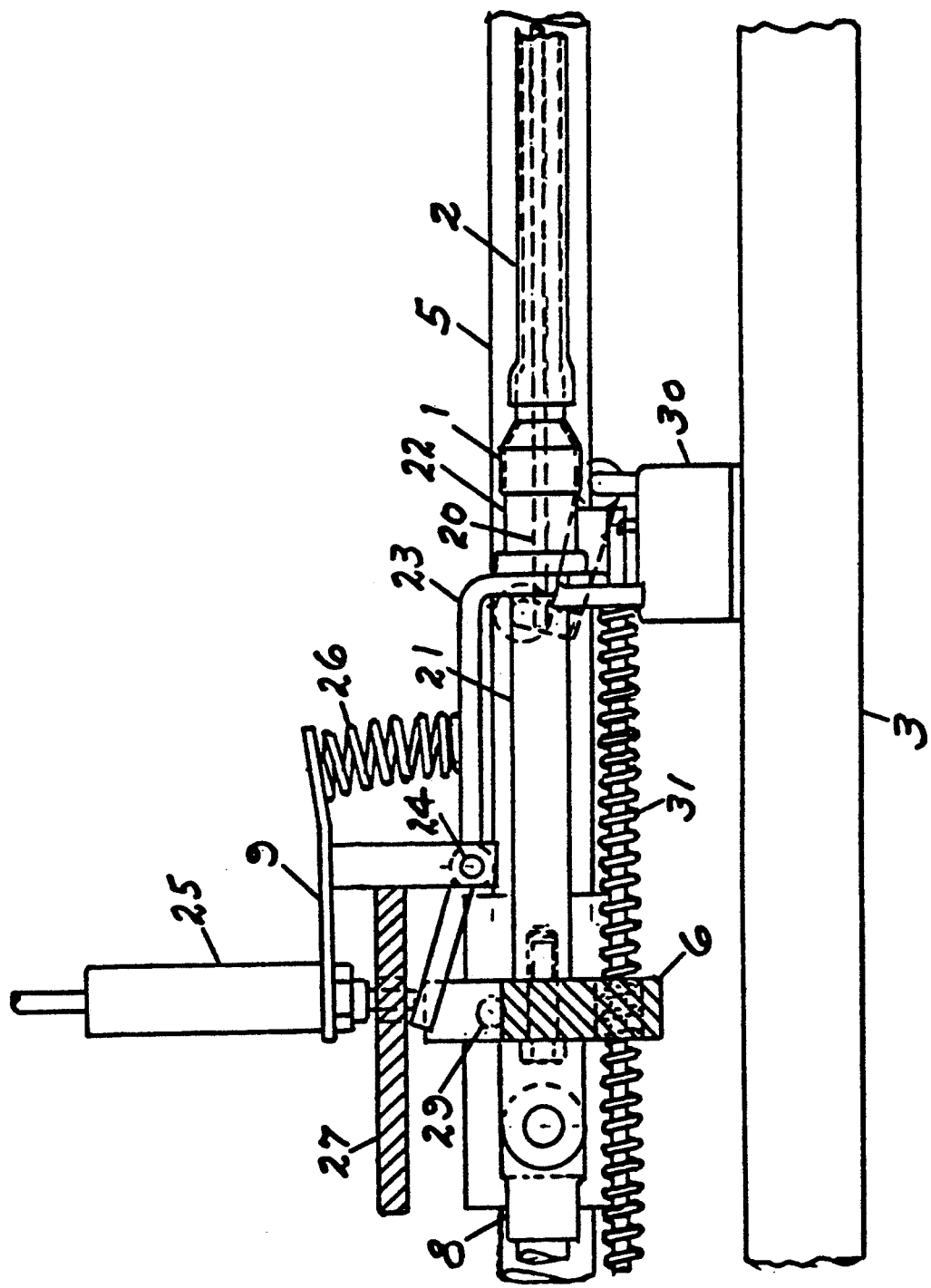
FIG. 15 is a partial section taken on line 11—11 of FIG. 6 showing the stripping mechanism at the start of the stripping operation.

FIGS. 13 and 14 show the stripping mechanism in the position at the start of the stripping operation. A stripping sleeve 22 is slidably mounted on loading arbor 20 and is held normally against the end of supporting rod 21 by means of spring 31. A stripping plate 23 has a pivot at pin 24 and has vertical movement that is controlled by a miniature air cylinder 25 and spring 26 and is supported by plate 27 that is bolted to upright member 28 that is attached to frame 3. Stripping plate 23 is in engagement with stripping sleeve 22 as shown in FIGS. 13 and 14. The carriage 6 has a dog 29 attached to it that is arranged to contact and operate a one-way direction limit switch 30. The limit switch 30 only makes electrical contact when the carriage with its dog 29 is moving in a direction away from the squeeze head 7. FIG. 10 shows the stripping mechanism as it is in the non-stripping position.

The necessary electrical diagrams and valve sequencing diagrams are not shown as anyone skilled in the art can devise the proper controls for this purpose.

Further embodiments of the squeeze head will be described with reference to FIGS. 16-21. Each of these squeeze heads may be substituted for the squeeze head 7 shown in FIGS. 7-10 and 12. The remainder of the apparatus remains the same as shown in FIGS. 5-15.

Figure 16:
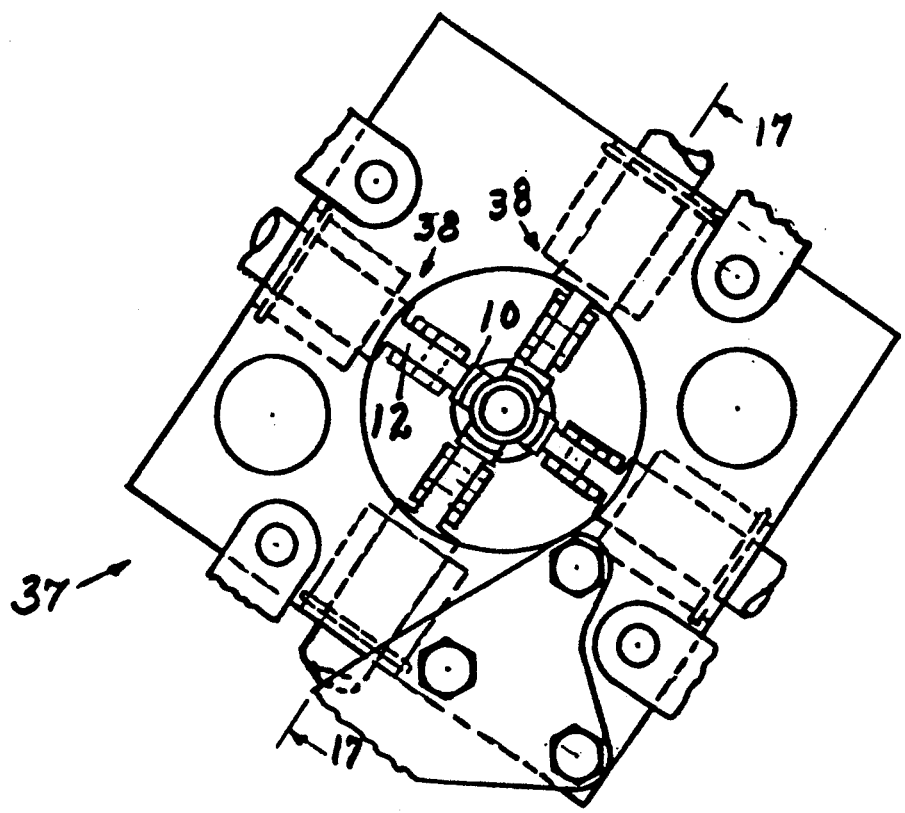
FIG. 16 is an end view of a squeeze head according to a second embodiment of the invention, taken in the same direction and from the same vantage point as FIG. 7.
Figure 17:
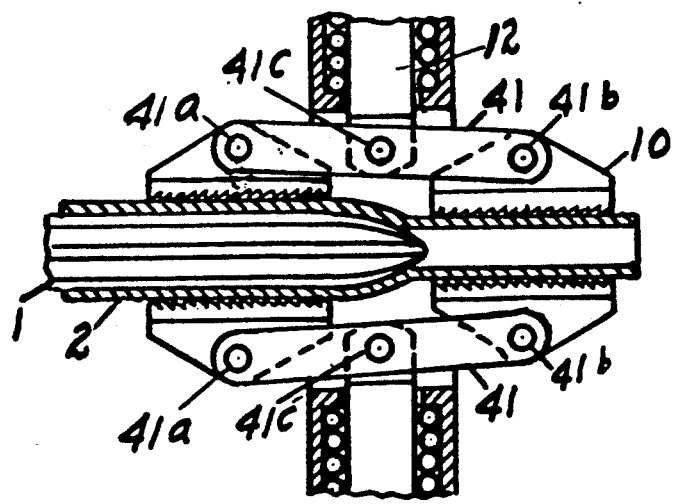
FIG. 17 is a partial section of the squeeze head of FIG. 16, taken along lines 17—17 of FIG. 16.

FIGS. 16 and 17 show a squeeze head 37 according to a second embodiment of this invention. These figures show a tandem arrangement win which the gripping means comprises 4 sets 38 of gripping members 10, each set comprising 2 gripping members pivotally mounted in tandem with the opposite ends of fulcrum lever by means of pivot pins 41a and 41b. The fulcrum lever 41 is pivotally mounted on the end of a slotted rod 12 by means a centrally located pivot pin 41c. Thus each rod 12 carries 2 gripping members 10, which by virtue of the fulcrum lever 41 can simultaneously contact and grip different portions of an elastic sleeve 2 having different diameters, as shown in FIG. 10. There are 4 rods which are equiangular disposed and which extend radially from the longitudinal axis of the squeeze head. These rods 12 may be identical or similar to their counterparts in FIGS. 5-15 and are capable of radial movement toward and away from the longitudinal axis of the squeeze head. Such movement may be accomplished by the mechanism shown in FIG. 7.

Figure 18:
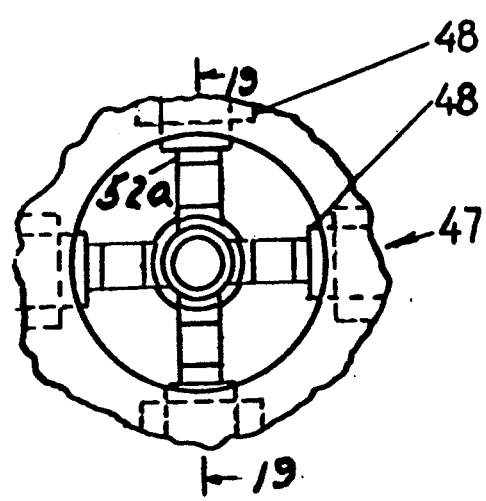
FIG. 18 is an end view of a squeeze head according to a third embodiment of 1, and taken in the same direction from the same vantage point as FIG. 7.
Figure 19:
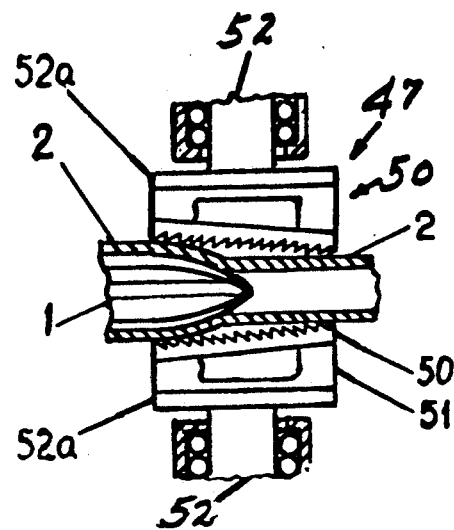
FIG. 19 is a partial sectional view of the squeeze head of FIG. 18, taken along line 19—19 of FIG. 18.

FIGS. 18 and 19 show a squeeze head 47 according to a third embodiment of this invention. The squeeze head 47 according to this embodiment of the invention includes 4 gripping assemblies 48 arranged equiangularly around the longitudinal axis of the squeeze head. Each gripping assembly comprises a gripping member 50 with is preferably hard (e.g., metallic) which has a toothed surface for gripping a sleeve 2. Each gripping member 50 is supported on and bonded to generally U-shaped resilient (e.g., rubber) backing member 51, which in turn is bonded to a radially movable radially extending rod 52 which terminates at one end (i.e., its inner end, or the end closest to the longitudinal axis of the squeeze head) in a plate 52a, to which the backing member is bonded. The resilient backing member permits the gripping member 50 to rock about an axis which is perpendicular to the axis of the rod 52 and thereby simultaneously grip different portions of an elastic sleeve 2 which have different diameters. Radial (or longitudinal) movement of the rods 52 may be accomplished by a mechanism as shown in FIG. 7.

Figure 20:
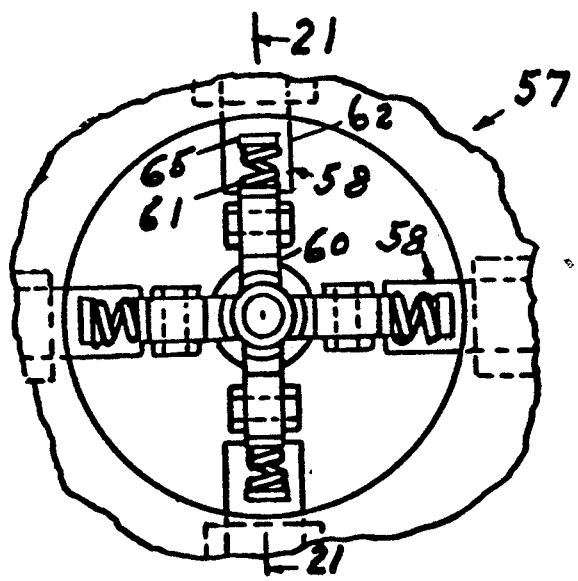
FIG. 20 is an end view of a squeeze head according to a forth embodiment of this invention, taken in the same direction and from the same vantage point as FIG. 7.
Figure 21:
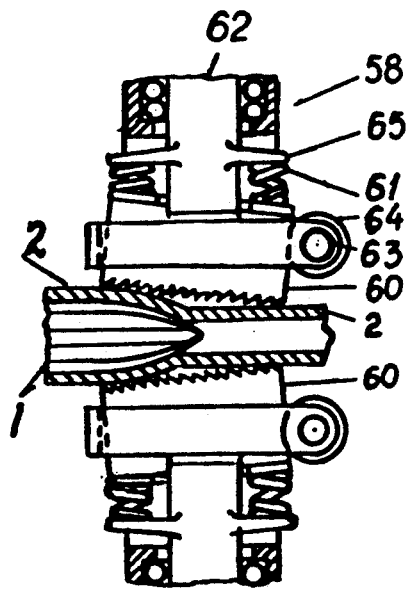
FIG. 21 is a partial sectional view taken along line 21—21 of FIG. 20.

FIGS. 20 and 21 illustrate a squeeze head 57 according to a forth embodiment of this invention. Squeeze head 57 comprises 4 gripping assemblies 58, equiangularly arranged around the longitudinal axis of the squeeze head. Each gripping assembly 58 comprises a toothed gripping member 60 which is spring mounted by means of a pair of springs 61 on radially movable rod or stem 62. These springs 61 permit these gripping member 60 to have a rocking motion so that it can engage a portion of a rubber sleeve having different diameters as shown in FIG. 21. This spring bears against a pair of lateral projections 65 which extend laterally from rod 62. These projections 65 serve essentially the same purpose as a collar but do not extend around the entire circumference of the rod 62. A generally rectangular cage 63 which has a central opening for the gripping member 60, holds the gripping member 60 in place while permitting the rocking movement which enables the gripping member to grip portions of sleeve 2 having different diameters. The width of the central opening in cage 63 is essentially the same as the width of the gripping member 60 (actually, just slightly larger) so as to hold the gripping member in place without binding. A wheel 64 mounted at one end of the cage 63 facilitates the aforesaid rocking movement. Rods 62 may be reciprocated radially toward or away from the longitudinal axis of the squeeze head 57 by means of a mechanism as shown in FIG. 7.

DESCRIPTION OF THE OPERATION

An operator places a liner 1 on the arbor 20 as shown on FIGS. 10 and 11, then holds a rubber sleeve 2 in the squeeze head 7 against the stop lever 17 as shown in FIG. 9 and then presses a start button or uses other means to start the operating cycle. The inner surface of the elastic sleeve 2 is lubricated before it is placed on the squeeze head. This facilitates insertion of the liner into the sleeve (or placement of the sleeve over the liner). A suitable lubricant is a liquid silicone, which can be sprayed onto the inner surface of sleeve 2. The toothed members 10 then close on and squeeze the rubber sleeve 2 to immobilize it and hold it. The main air cylinder 8 is then actuated to advance the carriage 6 and arbor 20 along a longitudinal path toward the rubber sleeve 2 and to push the liner 1 into the rubber sleeve 2 as shown in FIG. 10 and FIG. 12. Sleeve 2 expands radially as liner 1 is inserted, as shown in FIG. 10. This results in axially displaced portions of sleeve 2 of different diameters. Grip members 10 simultaneously contact both portions. The main air cylinder 8 is then retracted. As the carriage 6 passes the one way limit switch 30 the dog 29 on the carriage 6 activates the limit switch 30 to control the miniature air cylinder 25 to cause the stripping plate 23 to move downward to contact the stripping sleeve 22 and strip the liner 1 with its assembled rubber sleeve 2 off the arbor 20 as shown on FIG. 13.

Operation using any of the alternative squeeze heads shown in FIGS. 16-21 is similar to operation as aforedescribed.

What is claimed is:

1. Apparatus for forming a container assembly comprising an expandable plastic inner liner having an open end inside a heavy walled elastic sleeve, said apparatus comprising:
   (a) a plurality of grip members, each having a friction surface arranged to contact and grip the outer surface of said elastic sleeve;
   (b) a plurality of radially movable support members for said grip members, said support members being radially moveable toward and away from a common center, each of said support members having an inner end in proximity with said common center and an outer end remote from said common center, said grip members being pivotally mounted on said support members at the inner ends thereof;
   (c) an axially movable arbor on which said plastic inner liner can be placed;
   (d) means for axially moving said arbor and a plastic inner liner placed thereon relative to said elastic sleeve and for inserting said inner liner into said sleeve while said sleeve is held by said grip members; and
   (e) means for stripping the container assembly from said arbor, said means comprising a stripping sleeve slidable on said arbor and having an end portion adapted to engage the open end of said inner liner to restrain axial movement thereof, and means movable toward and away from said stripping sleeve for restraining axial movement of said stripping sleeve and said container assembly while said arbor is retracted.

2. Apparatus according to claim 1 wherein said radially movable support members are rods.

3. Apparatus according to claim 1 wherein said end portion is frustoconical and is adapted to enter the open end of said inner liner and wherein said stripping sleeve further comprises an essentially cylindrical body portion having passageway means extending therethrough for slidably receiving said arbor.

4. Apparatus for forming a container assembly comprising an expandable plastic inner liner having an open end inside an heavy walled elastic sleeve, said apparatus comprising:
   (a) a plurality of grip members, each having a friction surface arranged to contact and grip the outer surface of said elastic sleeve;
   (b) a plurality of radially moveable rods for supporting said grip members, said rods being radially moveable toward and away from a common center, each of said rods having an inner end in proximity with said common center and an outer end remote from said common center, said grip members being pivotally mounted on said rods at the inner ends thereof;
   (c) an axially moveable arbor on which said plastic inner liner can be placed;
   (d) means for axially moving said arbor and a plastic inner liner placed thereon relative to said elastic sleeve and for inserting said inner liner into said sleeve which said sleeve is held by said grip members; and
   (e) means for stripping said container assembly comprising said inner liner and said sleeve from said arbor, said means for stripping said container assembly from said arbor comprising a stripping sleeve slidable on said arbor and adapted to enter the open end of said inner liner, and means comprising a pivotally mounted plate moveable toward and away from said stripping sleeve for restraining axial movement of said stripping sleeve while said arbor is retracted.

5. Apparatus for forming a container assembly comprising and expandable plastic inner liner having an open end inside a heavy walled elastic sleeve, said apparatus comprising:
   (a) a plurality of grip members, each having a friction surface arranged to contact and grip the outer surface of said elastic sleeve;
   (b) a means to mount the grip member for movement to and form a gripping position;
   (c) an axially movable arbor on which said plastic inner liner can be placed;
   (d) means for axially moving said arbor and a plastic inner liner placed thereon relative to said elastic sleeve and for inserting said inner liner into said sleeve while said sleeve is held by said grip members; and
   (e) means for stripping the container assembly from said arbor, by effecting relative movement between the arbor and the liner and sleeve combined, including means to engage the open end of said inner liner to restrain axial movement thereof.

6. Apparatus according to claim 5 wherein said gripping means comprises a plurality of grip members, each having a friction surface arranged to contact to grip the outer surface of said elastic sleeve, and wherein said radially movably supports means comprises a plurality of radially movably supports members for said grip members, said support members being movable toward and away from a common center, each of said support members having an inner end in proximity with said common center and an outer end remote from said common center, said grip members being pivotally mounted on said support members at the inner ends thereof.

7. Apparatus according to claim 6, further including a fulcrum lever pivotally mounted at the inner end of each of said radially movable support members, and a pair of said grip members pivotally mounted on the fulcrum lever at the ends thereof.

* * * * *